(12) United States Patent
Elliott

(10) Patent No.: US 9,023,135 B1
(45) Date of Patent: May 5, 2015

(54) SELF-CLEANING AIR FILTRATION SYSTEM

(71) Applicant: Cory Elliott, Columbus, OH (US)

(72) Inventor: Cory Elliott, Columbus, OH (US)

( * ) Notice: Subject to any disclaimer, the term of this patent is extended or adjusted under 35 U.S.C. 154(b) by 0 days.

(21) Appl. No.: 14/179,624

(22) Filed: Feb. 13, 2014

(51) Int. Cl.
*B01D 46/00* (2006.01)

(52) U.S. Cl.
CPC .................................. *B01D 46/0068* (2013.01)

(58) Field of Classification Search
USPC .................... 55/283–284, 293–294, 301–305, 55/341.1–341.7, 361–382; 95/273–287
See application file for complete search history.

(56) References Cited

U.S. PATENT DOCUMENTS

| 3,756,416 A * | 9/1973 | Wood | 210/408 |
| 2004/0118283 A1* | 6/2004 | Hering | 95/280 |

* cited by examiner

*Primary Examiner* — Thomas McKenzie
(74) *Attorney, Agent, or Firm* — John R. Benefiel

(57) ABSTRACT

A self-cleaning system and method for removing contaminants captured by an air flow filter media in which a reverse air flow is directed back through the filter media and into an antechamber which is closed during self-cleaning and a vacuum source is connected to the antechamber to quickly evacuate the air in said antechamber containing dislodged contaminants suspended therein.

5 Claims, 2 Drawing Sheets

SELF-CLEANING AIR FILTRATION SYSTEM

BACKGROUND OF THE INVENTION

This invention concerns air filtration such as is used in HVAC and industrial air filtration and dust collection systems.

High efficiency filters remove a large proportion of contaminants, but will quickly become clogged due to buildup of the contaminants on the filter media since a great proportion of the contaminants in the air flow will be filtered out.

Much labor would be required to keep such filters clear by manual removal of the build up of contaminants captured by the filter media.

For this reason, disposable or cleanable prefilters are often used to remove the larger contaminants from the air stream in order to reduce the servicing requirements for the more costly high efficiency filters. However, the inclusion of additional prefilters will add to the maintenance costs of the system.

Self-cleaning air filters are well known which typically carry out cleaning by establishing a reverse air flow through the filter media to dislodge the contaminants, and collecting these contaminants in a lower space which is accessible for periodic disposal of the collected contents.

In this arrangement, dislodged contaminants may be suspended in the air just upstream of the filter media, and can be drawn back onto the filter media when normal operation is restarted.

In another arrangement, a sustained reverse flow can be established which is directed to an exhaust port to thereby make sure that the contaminants are not recaptured by the normal air flow after the reverse flow ceases.

This approach interrupts normal air flow for a significant time and requires a substantial volume of reverse flow through the filter media and a purging flow through the space just upstream of the filter media.

It is also known to periodically direct a brief reverse flow to dislodge the contaminants from the filter media, which it is hoped will settle out and be received in a collection space. This approach minimizes the interruption of normal operation, but is even more likely to result in dislodged contaminants being drawn to the filter media after normal flow through the filter is restored as described above, since only a brief reverse flow occurs, and all of the contaminants will likely not have a chance to settle out away from the filter media before restarting normal air flow.

It is an object of the present invention to provide a self-cleaning air filtration system which will minimize the interruption of the normal air flow in the system while insuring a rapid and substantially complete removal of dislodged contaminants.

SUMMARY OF THE INVENTION

The above recited object of the invention and other objects which will be understood by one skilled in the art upon a reading of the following specification and claims are achieved by periodically establishing a short duration reverse flow of high pressure air through the filter media into an antechamber adjacent the filter media which normally receives the air flow to be filtered. The antechamber is briefly closed off from normal air flow as by closing dampers immediately upstream from the antechamber at the start of the cleaning cycle. A vacuum source is thereafter briefly connected to the antechamber with a sufficiently high vacuum to quickly evacuate air from the antechamber, and in a short time removing all of the solid contaminant particles suspended in the air in the antechamber which have been dislodged by the reverse flow through the filter media.

Thus, a minimized period of interruption of normal operation is achieved, while insuring a substantially complete removal of dislodged contaminant particles.

DETAILED DESCRIPTION

Figure 1:
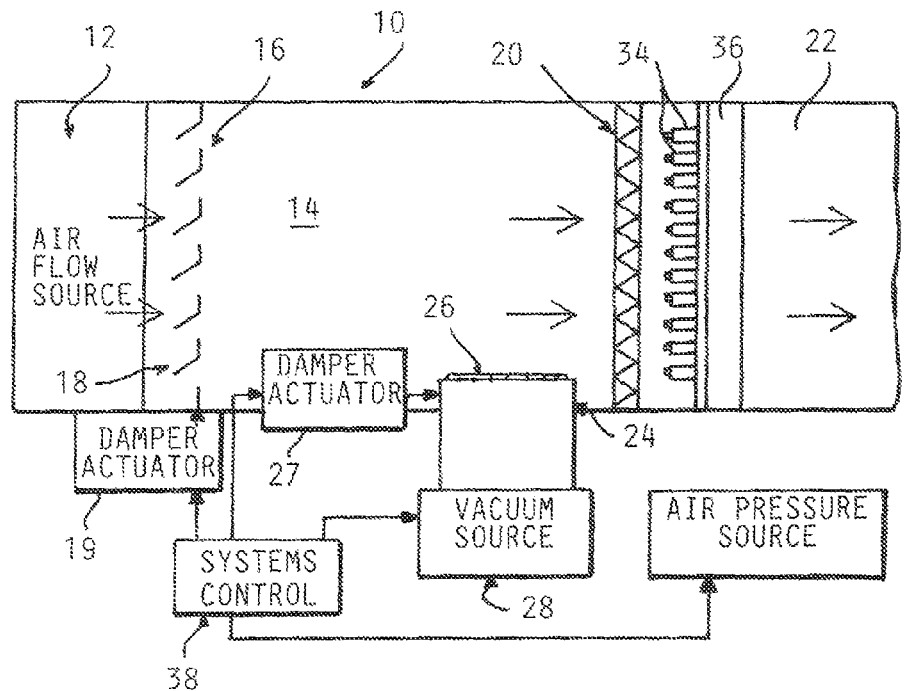
FIG. 1 is a diagrammatic representation of a filtration section of an air delivery system according to the invention in a normal operating state.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, a self-cleaning filtration section 10 of an air flow system according to the invention is depicted diagrammatically in its normal operating state, in which a sustained air flow from a source 12 is directed into an antechamber 14 adjacent a filter media on the inlet side thereof.

A damper mechanism 16 including an actuator 17 is provided which is normally open but is controllably operable to close off an air inlet 18 at the inlet end of the antechamber 14 which receives the air flow to be filtered.

The filter media 20 is disposed at the other end of the antechamber 14 which receives air flow to be filtered, passing through the same and into an outlet 22.

A vacuum suction port 24 is also provided opening into the antechamber 14 with a damper mechanism 26 including an actuator 27 is provided which is also normally closed but is able to be controllably opened.

The vacuum port 24 is located adjacent to the inlet side of the filter media 20, and is connected to a vacuum source 28 which can be comprised of a vacuum pump which is turned on and off to draw air out of the antechamber 14 or another vacuum source which is controllably connected to the antechamber 14.

The reverse air flow delivery system 30 includes a source of high pressure air 32 such as the output of a blower.

The reverse air flow delivery system 30 is connected to an array of flow nozzles 34 mounted in the outlet chamber 22 with a manifold 36 positioned just downstream of the filter media 20 to create high velocity jets of reverse air flow directed at the filter media 20.

Various arrangements for generating the vacuum and reverse air flow are possible as will be understood by those skilled in the art.

The array of nozzles 34 being juxtaposed to the upstream side of the filter media 20 allows a high velocity reverse flow of air to be periodically directed back through the filter media 20 into the antechamber 14.

The reverse air flow causes gusts of high velocity reverse air flow through the filter media 20 to occur.

Figure 2:
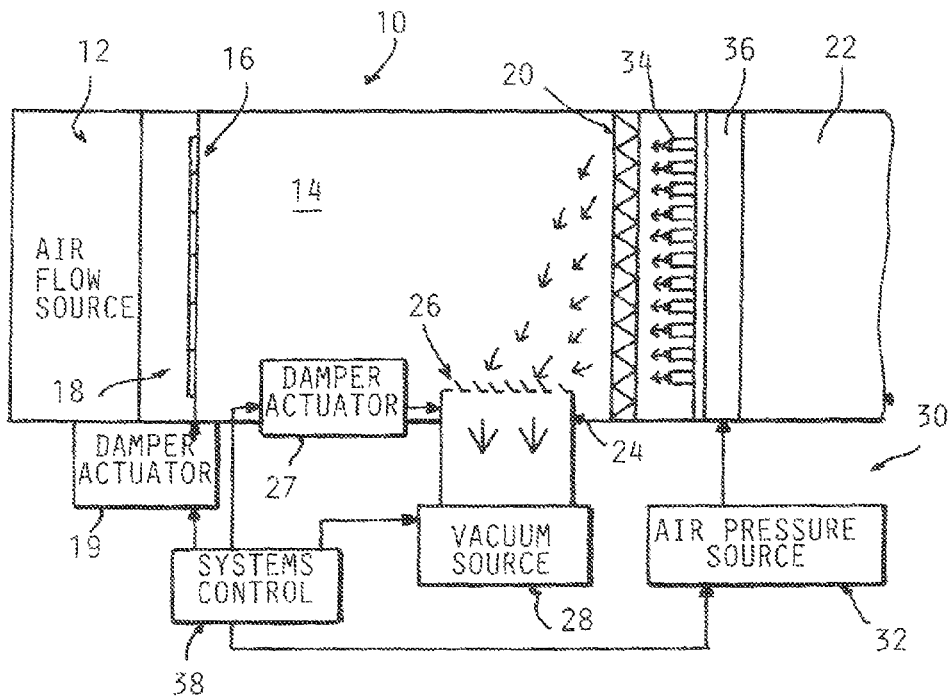
FIG. 2 is a diagrammatic representation of the filtration section of an air delivery system shown in FIG. 1 undergoing a periodic self-cleaning operation.

At the beginning of a self-cleaning cycle, the air inlet damper mechanism 16 is operated by activation of the actuator 17 by system control 38 to close off the antechamber 14 from its air inlet 18, as seen in FIG. 2.

At the same time a reverse air flow is initiated, as by establishing a reverse air flow from source 32, the vacuum port 24 is opened as by operating the damper mechanism 26 with actuator 27 to open the same and establish a fluid connection to the vacuum source 28.

This initiates a rapid evacuation of air from the antechamber 14 to very quickly carry off the dislodged contaminants which have been suspended in the air in the antechamber 14 by the reverse air flow.

The vacuum suction port 24 is thereafter operated to close off communication of the vacuum source 28 with the antechamber 14.

The inlet damper mechanism 16 is reopened by actuator 17 at the same time to restore normal operation.

Thus, a minimized time of interruption of normal air flow operation is required, since the high velocity jets and vacuum evacuation of dislodged contaminants greatly expedite the self-cleaning process.

The actual duration of the reverse air flow and the magnitude of the reverse flow velocities would depend on the needs of a particular application, as will be understood by those skilled in the art.

Figure 3:
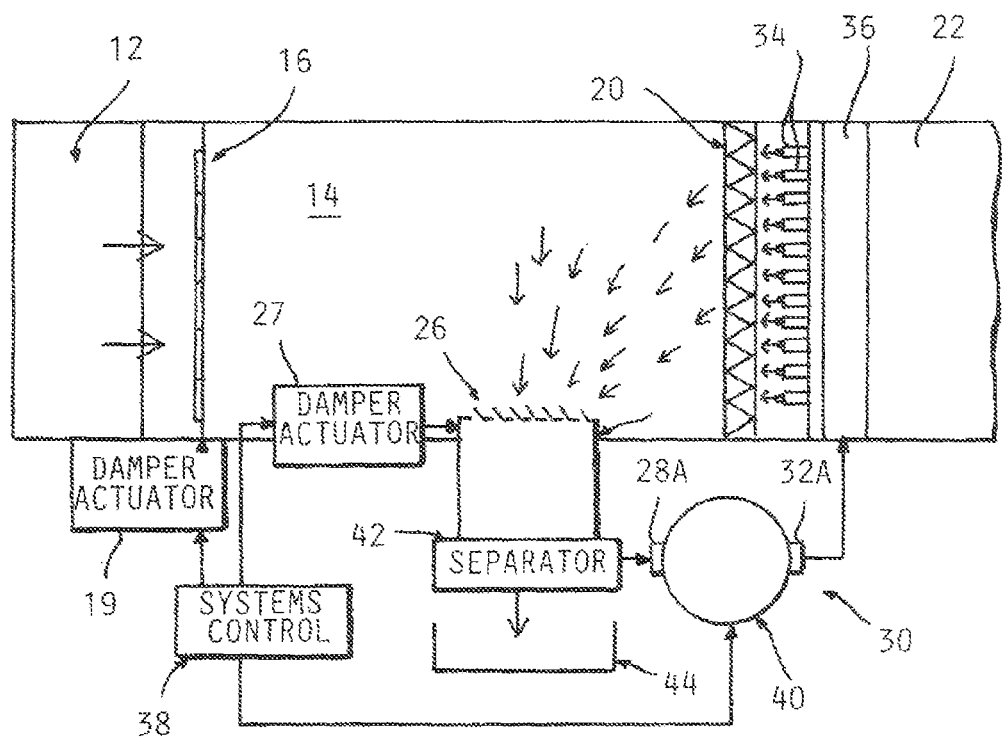
FIG. 3 is a diagrammatic representation of the air delivery system of FIGS. 1 and 2 showing a combined vacuum and air flow sources.

FIG. 3 shows a vacuum source comprised of the inlet 28A to a blower 40.

A separator 42 is required, such as a cyclonic filter to remove the solid contaminants and deposit the same in a collector 44.

The reverse air flow delivery 30 comprises the outlet 32A of the blower 40 connected to manifold 36 to supply the reverse air flow to the nozzles 34.

The invention claimed is:

1. A method of periodically cleaning a filter media mounted at a fixed location in an enclosure through which air to be filtered flows to pass through said filter media to remove contaminants therefrom, comprising:

directing air flow through said filter media at said fixed location from an output of a blower in a direction reverse to a direction of said air flow through said enclosure during normal filtering at a sufficiently high velocity to dislodge contaminants from said filter media and into an antechamber defined as a region within said enclosure upstream of said filter media at said location, said antechamber normally receiving air flow to be filtered flowing through said enclosure just prior to passing into said filter media;

connecting a vacuum source to said antechamber via a port entering into said antechamber adjacent the upstream side of said filter media to induce an outflow of air from said antechamber when said reverse flow of air is being directed through said filter media from an output of said blower, said vacuum source comprising an inlet to said blower, whereby dislodged contaminants dispersed in air in said antechamber by said reverse air flow are evacuated from said antechamber by said outflow of air with said dislodged contaminants dispersed therein induced by said connection to said blower inlet.

2. The method according to claim 1 wherein said enclosure is provided with an inlet for normally receiving an inflow of air to be filtered and said inlet is controllably closed by operating a damper mechanism located over said inlet at the initiation of said reverse air flow through said filter media.

3. The method according to claim 1 further including opening and closing said vacuum port opening into said antechamber whereby opening said vacuum port connects said antechamber with said blower inlet and closing said vacuum port disconnects said blower inlet from said antechamber.

4. The method according to claim 3 wherein opening and closing said vacuum port is carried out by operating a damper mechanism associated with said vacuum port.

5. The method according to claim 1 wherein said reverse air flow is directed back through said filter media by directing said reverse air flow from said blower output through an array of nozzles juxtaposed next to said filter media and extending across the length and width of said filter media so as to create jets of air flow directed back through said filter media so as to dislodge contaminants on the upstream side of said filter media.

* * * * *